May 24, 1927. 1,629,500
J. GOOD
ENGINE FUEL SYSTEM
Filed March 16, 1918 4 Sheets-Sheet 1
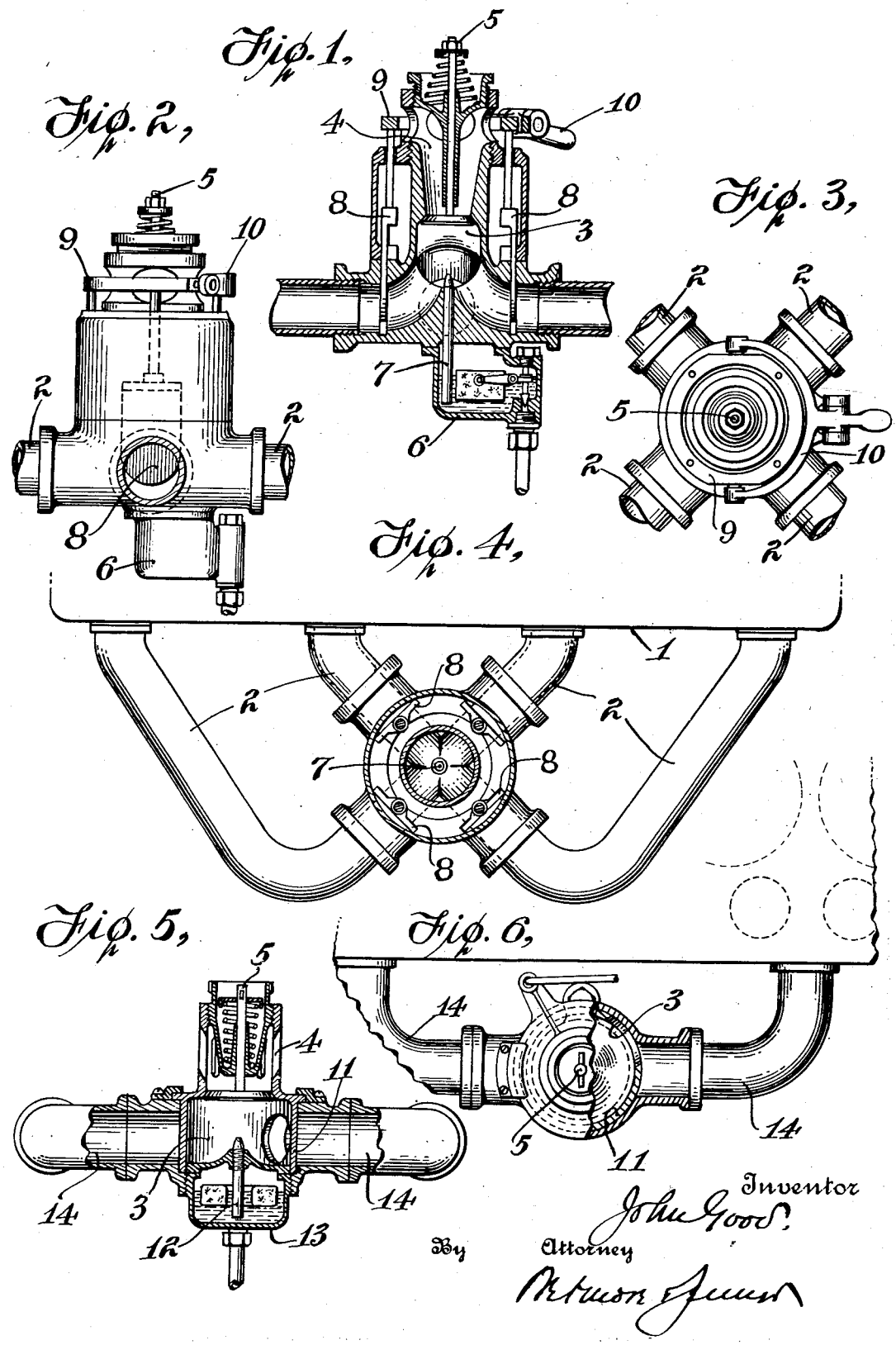

May 24, 1927.
J. GOOD
1,629,500
ENGINE FUEL SYSTEM
Filed March 16, 1918   4 Sheets-Sheet 2
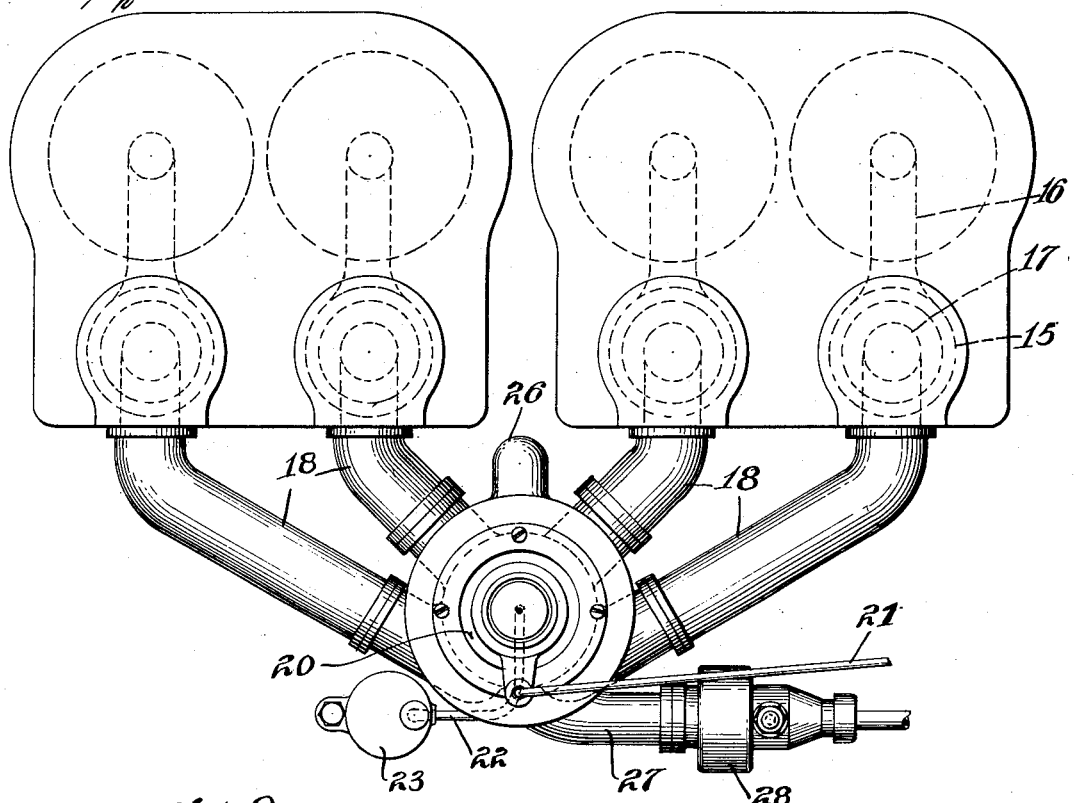
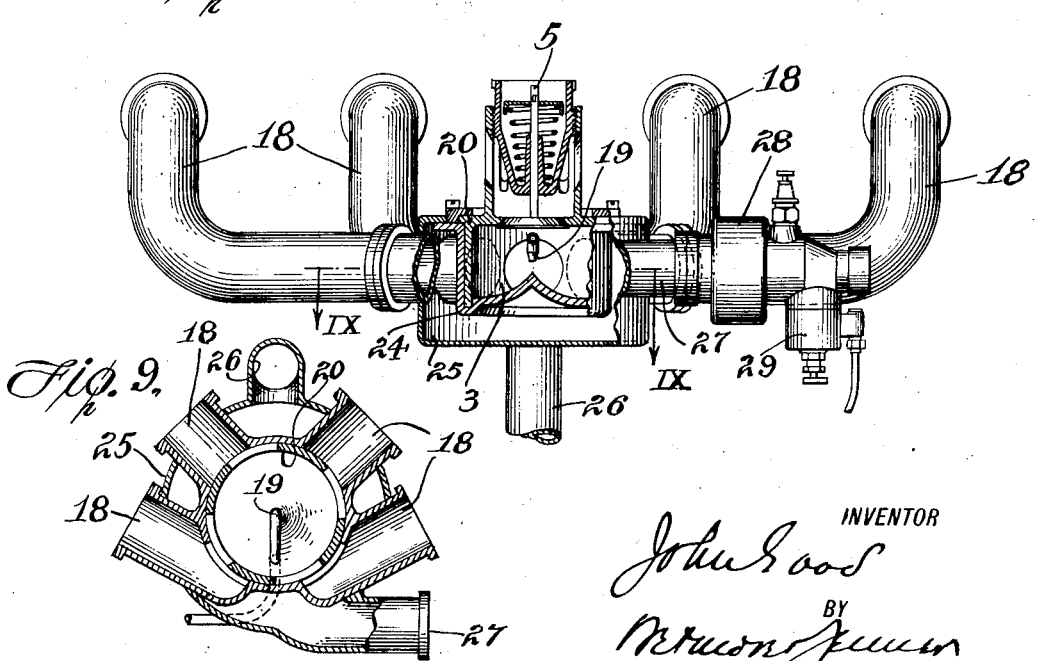

May 24, 1927.
J. GOOD
1,629,500
ENGINE FUEL SYSTEM
Filed March 16, 1918
4 Sheets-Sheet 3
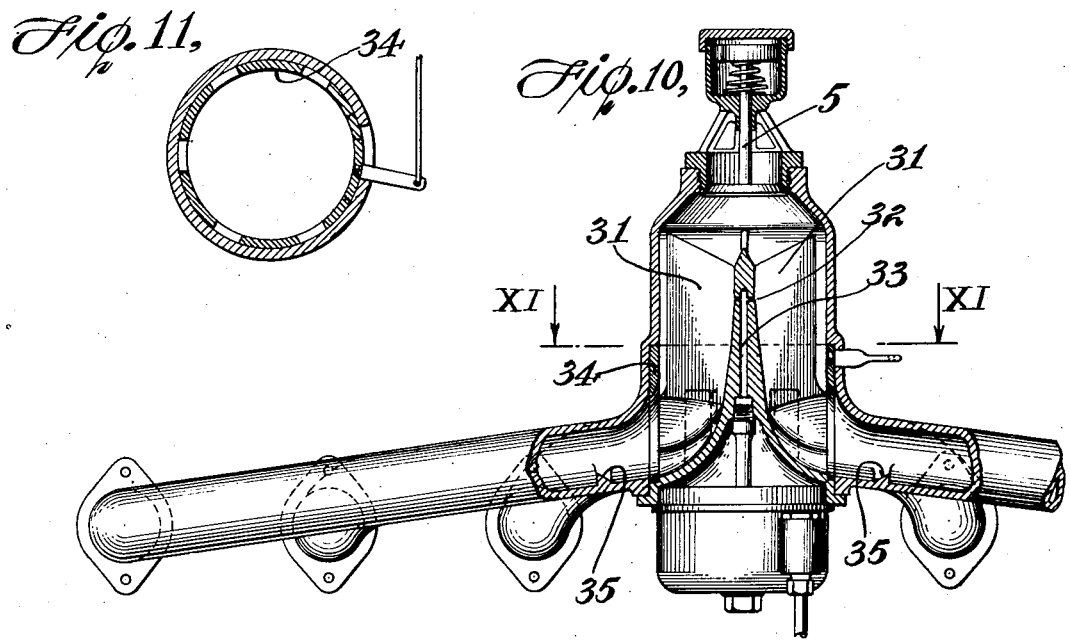
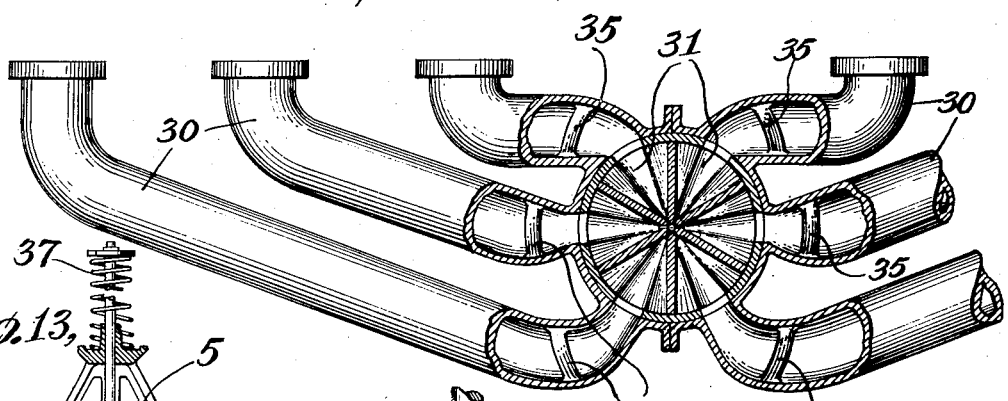
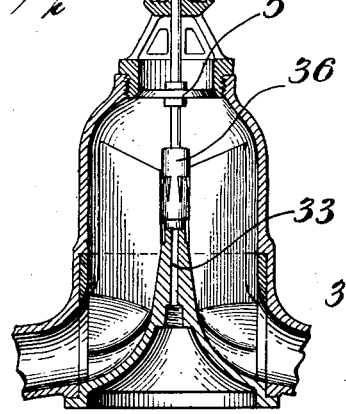
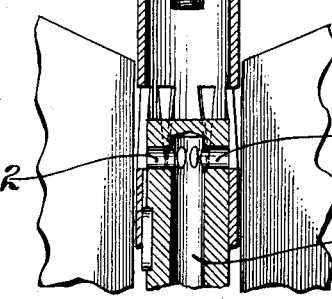
INVENTOR
John Good
BY
ATTORNEY May 24, 1927.

J. GOOD 1,629,500

ENGINE FUEL SYSTEM

Filed March 16, 1918   4 Sheets-Sheet 4

INVENTOR
John Good,
BY
ATTORNEY

Patented May 24, 1927.

1,629,500

UNITED STATES PATENT OFFICE.

JOHN GOOD, OF BROOKLYN, NEW YORK, ASSIGNOR TO GOOD INVENTIONS CO., OF NEW YORK, N. Y., A CORPORATION OF NEW YORK.

ENGINE FUEL SYSTEM.

Application filed March 16, 1918. Serial No. 222,828.

The invention concerns the distribution of the fuel mixture from the carburetor to the combustion spaces of multi-cylinder engines and provides a simple, practical and highly efficient means for delivering equal portions of the liquid component of the mixture to each engine cylinder, notwithstanding that such liquid may be unsuspended and in the form of a stream or film on the walls of the passages, thus insuring equal power development in each cylinder and afforing numerous practical advantages which will need no explanation to the engineer skilled in this subject. It is well recognized that so-called carburetted mixtures emanating from a carburetor in action contain much liquid fuel in suspension in the air and that despite careful design of branching manifolds the liquid tends to divide unequally among the branches starving some cylinders and overfeeding others, and this very greatly complicates the carburetor adjustment since it makes it necessary to set it to a happy medium between the various unequal flows rather than to the most efficient degree of mixture richness. The present invention overcomes these difficulties by providing separate intake passages from the carburetor to the combustion cylinders, which said passages are organized with special reference to the conduction of liquid as well as the vaporous air mixture and are jointly controlled by an appropriate throttle or throttles. The invention further provides important advantages incident to the equal liquid distribution thus obtained and having special reference to the operation of combustion engines of the kind which includes hot surface vaporizers within the engine cylinder or at the entrance thereto as below explained. The invention consists therefore in the embodiments of the principles illustrated in the special organization of multiple intakes shown in the accompanying drawings, wherein—

Figs. 1, 2, 3 and 4 are respectively a central vertical section, side elevation, top plan and horizontal section of a fuel distribution system according to this invention and adapted to serve a four cylinder engine;

Figs. 5 and 6 are respectively a central vertical section and top plan partly broken out, of a modified form of junction chamber, serving two intake pipes which may deliver to four cylinders:

Fig. 7 is a further modification of a fuel distributing system applied to a vaporizer type engine;

Fig. 8 is a central section and side elevation of Fig. 7; and

Fig. 9 is a horizontal section through the distributing chamber of Figs. 7 and 8;

Fig. 10 is a side elevation and partly sectional view of the development of the present invention adapted to a six cylinder engine having six intake pipes;

Fig. 11 is a cross section thereof on line XI—XI;

Fig. 12 is a cross section of Fig. 10 at the plane of the entrances to the various intake pipes;

Fig. 13 is a central vertical section of a modified form of composite fuel nozzle with automatically adjustable orifice means; and Fig. 14 is an enlarged detail of the metering member thereof;

Figure 15:
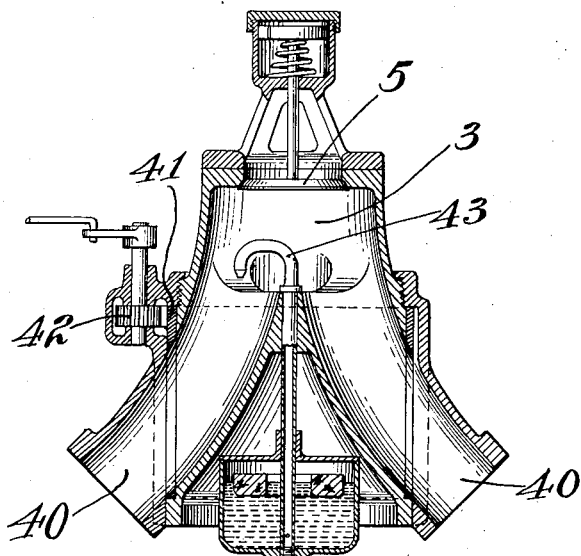
Fig. 15 is a central vertical section of a junction chamber according to the present invention having a rotary distributing fuel nozzle.

In the form of Figs. 1 to 4 the side face of a multi-cylinder engine, with the cylinders cast en bloc, is indicated at 1 and the several intake valves of the engine are served by separate intake pipes 2. These separate pipes radiate from a common central chamber 3 which is the junction point between them and a main air intake passage 4, the entrance to which is controlled by inlet valve means 5. The suction of the eigine cylinders communicated to the chamber 3 through the several intake pipes opens the air valve, as in the case of ordinary carburetors, and establishes a suction pressure in the said chamber which is utilized in whole or in part as the means for causing movement of liquid fuel from a fuel receptable such as 6 through a fuel nozzle such as 7 into the said chamber. The fuel receptacle is desirably float-controlled as indicated and the nozzle 7 is desirably provided with some means of regulating the discharge orifice which are not illustrated being common in the art. The said nozzle is centrally mounted in the junction chamber 3 in symmetrical relation to the entrances to each intake pipe so that the liquid fuel discharged therefrom may flow or fall into whichever of said entrances may be connected at the moment to a cylinder making its suction stroke. It will be understood that the four intake pipes are subject to the engine suction in succession so that air from the main air trunk passage 4 passes the junction chamber 3 en route to different cylinders and is mixed, more or less, with the liquid fuel in said chamber as well as in the entrance to the intake pipe, the liquid fuel being thus distributed in the chamber to the several cylinders. Substantially an equal amount will thus be discharged into each intake pipe and carried by the air into the engine. The intake pipes are desirably so arranged and their connections with the fitting in which the distributing chamber 3 is formed are of such a nature as to be devoid of any liquid retaining cavities and so as to insure that all of the liquid discharged will be swept into the engine cylinders.

The control of the engine is effected by means of separate gate valve throttles 8, one for each intake pipe and these valves are all connected to a ring 9 which may be raised and lowered by the manipulation of a throttle lever 10 as will be evident.

In the form of Figs. 5 and 6 the central distributing chamber 3 is formed within the interior of a rotary barrel-form throttle 11 which itself carries the main air truck or inlet 4 and the inlet valve 5. The liquid fuel nozzle 12 discharges centrally in this chamber from a fuel receptacle 13 and in such manner that the air current sweeps the liquid into whichever intake passage is experiencing the engine suction.

Only two intake pipes are shown in this form, each one of which however may deliver to two intake valves as in the case of certain engine designs in which the intake valves of adjacent cylinders are placed side by side and supplied through a common entrance. With such arrangement unsuspended liquid is found to deliver with substantial equality to both cylinders because of the proximity of the valves and their symmetrical relation to the single inlet.

Figs. 7 and 8 illustrate the same principle applied to that type of engine in which the mixture from the carburetor is deposited or projected into a surface vaporizer to be vaporized either before or after its entrance into the combustion space. The vaporizers are indicated in dotted lines in Fig. 7 as consisting each of a chamber 15 in open communication with the combustion cylinder by a passage 16 and exposed to the combustion or exhaust gases so as to be kept hot. The mixture containing liquid fuel is discharged into the chamber 15 by a pipe 17; suitable intake valves are located between the chambers 15 and the pipes 17. These parts form the subject of a separate application and are not herein illustrated in detail because any type of hot surface vaporizer may be employed in their stead or, indeed, the incoming fuel mixture may be sufficiently vaporized if introduced in a direction to strike against the head of the exhaust valve which frequently is hot enough to give adequate vaporization for some grades of fuel. The several branch or intake pipes 18 radiate from a central distributing chamber 3 as in the other form. The chamber 3 contains the liquid fuel nozzle 19, in this case discharging downwardly and centrally against the point of a conical floor of the chamber. The engine regulating throttle 20 is of barrel type substantially like that of Figure 5, and contains and carries the usual air check valve 5 so that both the throttle and air check are revolved together when the connecting rod 21 is manipulated. The supply tube 22 for the spray nozzle 19 is passed through a slot (not shown) in the rotary throttle, above the level of the openings therein, so as not to interfere with its movement and said tube derives its supply of liquid fuel from a float chamber 23 disposed at a proper level. The casing 24 of the rotary throttle and the junctions of the several intake pipes therewith are enclosed in an outer jacket 25 having an exhaust outlet 26 and an inlet connection 27 through which it is adapted to receive and conduct a flame or other heating medium for initially vaporizing the liquid fuel when the engine is to be started in action and is cold. The drawing indicates an enclosed flame burner 28 as applied to the inlet 27, the same being constructed according to the principles explained in my prior Patent No. 1,207,897 or in my pending application Serial No. 195,506. A few seconds of operation of this burner will suffice to provide sufficient heat in the jacket 25 to vaporize the fuel and put the engine in its normal cycle. The said burner may and preferably should be connected to the same fuel source as the fuel nozzle 19 although it is shown for convenience as having an individual float chamber marked 29 in Fig. 8.

In each of the devices thus far described, it will be observed, the spray nozzle is located close to each intake entrance and the paths from it to the entrances are direct and uninterrupted so that at least in normal operation the fuel may be swept in the form of spray directly into whichever one of the individual intakes is subject to the engine suction at the moment, that is to say, without encountering any part of the device outside that intake on which the liquid may deposit. The floors of the distributing chambers shown, sloping downwardly from the nozzles in the direction of the air flow, assist in directing the air and suspended spray as well as the flow into the proper intake of any liquid that may at any time fall out of the air before it is well within one of the intakes. All cylinders therefore receive like charges of fuel as well as like amounts of air.

Figs. 10 to 12 illustrate six independent intake pipes 30 suitable to serve the six cylinders of a six cylinder engine and the distributing chamber therefor is divided into six stalls 31. Each stall constitutes the entrance to an intake pipe and is supplied with an individual fuel orifice 32 leading from a central main fuel duct 33 supplied from a float chamber mounted on the main casing below the distributing chamber or which may be mounted elsewhere if necessary to provide a liquid level at the proper height with relation to the orifices 32. The distributing chamber containing the stalls constitutes as before the entrance for the air for all the intakes and is therefore equipped with a main air valve 5, which in this case is provided with a dash pot as indicated in the drawings. Its delivery to the said intakes is controlled by a multiple throttle 34 of the barrel type adapted to close or restrict the communications between the stalls and the intakes. It will be observed that on the establishment of a suction pressure in the distributing chamber, imparted to it through one of the intakes, a substantially equal amount of fuel liquid will be discharged from each orifice 32. Those intakes which are not under suction from their own cylinders receive the same charge as the intake which is drawing a charge into its cylinder and the liquid fuel merely falls by gravity into the stalls and flows along the inclined floors thereof into those intakes. As air is drawn through the successive intakes the accumulating liquid on the floors thereof is swept to the respective cylinders and each intake will receive an identical liquid charge notwithstanding that it does not receive it all during the period of air flow. To guard against the accumulation of too much liquid on the floor of the intake pipes I sometimes provide small dams or baffles 35 to hold the liquid back and make the air current pick it up and carry it to the cylinder suspended so far as possible. These are merely desirable adjuncts and not essential to the performance of the apparatus. In engines with six, or more than four cylinders, more than one intake pipe is experiencing suction from its cylinder at the same time but by the present arrangement the overlapping of the suction periods creates no disturbance in the equality of distribution of the liquid since the overlap is uniform for all intakes and the resultant is constant.

Figs. 13 and 14 illustrate in a general way how the multiple orifice fuel nozzle may become a metering nozzle under the automatic control of the air-admission valve 5 and according to the well known principles of automatic regulation of carburetors, such regulation being for the purpose of keeping the charge mixture proportions constant throughout a wide range of load and speed. This consists in the present case, in connecting the air valve 5 with a sleeve or cap 36 fitting slidably over the end of the nozzle and formed with V-shaped or inclined slots or orifices and so organized with reference to the spring 37 as to make the orifices 32 either larger or smaller as the case may be and thereby preserve constant proportions of fuel and air in the charge mixture. Manifestly the sleeve 36 represents only one of many different metering instruments which may be similarly coordinated with the fuel orifices to produce the same effect.

Figure 16:
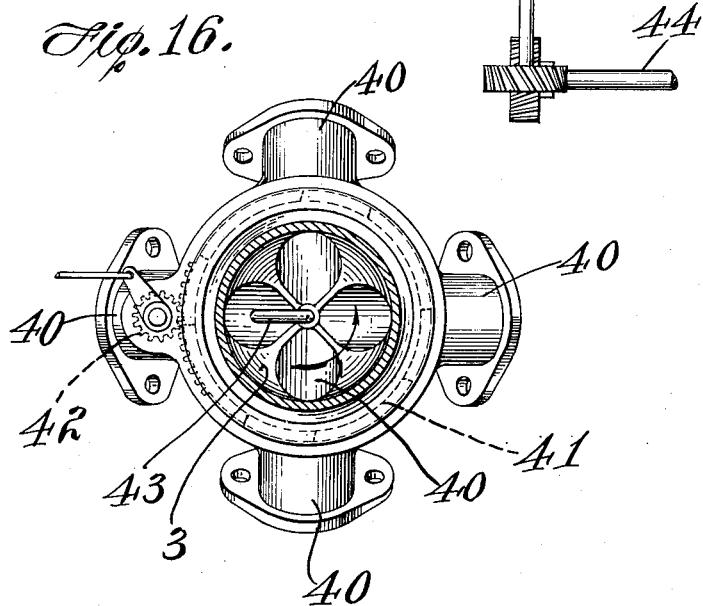
Fig. 16 is a cross section thereof above the level of said nozzle.

Referring now to Figs. 15 and 16, the distributing chamber 3 provided in this form is associated with an air admission valve 5 as in the preceding forms and delivers to each of several intake pipes 40 through a rotary barrel type throttle 41, operated by suitable mechanism 42. The fuel nozzle is centrally mounted in this distributing chamber and adapted to be rotated therein and for this purpose is appropriately journalled in the casing and also in the float chamber as indicated in the drawings or otherwise constructed for the same purpose. Its delivery end is formed as a spout 43 which rotates about the entrance to the intakes delivering to each of them in sequence. The nozzle is driven by bevel gears from a shaft 44 which is driven in some suitable manner not shown but in proper phase with the engine crank shaft and so that the spout will deliver to each intake in succession and at the time said intake is experiencing the suction of its cylinder.

It will now be apparent that the principle of the invention may be embodied in many different physical forms and with various additional features, in each of which liquid fuel, whether suspended or unsuspended will proceed in equal amounts to all the cylinders and from a central distributing chamber through which the air is admitted. The drawings do not illustrate the means which may be employed to set the proportions of fuel and air, since such means are well understood in the art, but it will be apparent that any setting that may be made with reference to one cylinder will be true for all the others since all receive like amounts of liquid and air whether the liquid is suspended in the air or not.

Claims:

1. In a multi-cylinder engine, a fuel distribution system comprising a fixed distributing chamber having an air entrance, a single liquid fuel nozzle disposed in said chamber, and individual passages opening from said chamber to conduct the fuel and air to the engine cylinders, said chamber being arranged to deliver unsuspended liquid fuel to said passages and to distribute the same equally between said passages, whereby the cylinders receive equal quantities of fuel.

2. In an engine the combination of a series of cylinders each having a liquid fuel vaporizer, and a fuel distribution system comprising a liquid fuel nozzle located in a main air trunk passage having a separate branch to each vaporizer, the nozzle being symmetrically disposed with reference to the entrances to said passages whereby equal quantities of unsuspended liquid may pass to the different vaporizers.

3. In an internal combustion engine a fuel distribution system comprising a distributing chamber subject to the suction pressure of the engine and having an air entrance and separate passages leading away from said chamber from the bottom thereof and connecting it to the engine cylinders and a compound liquid fuel nozzle in said chamber having a fuel orifice discharging toward each of said passages.

4. In an internal combustion engine the combination of more than four engine cylinders, a single distributing chamber therefor subject to the suction pressure from said cylinders and having a separate branch passage for and leading to each of said cylinders, and a nozzle through which liquid fuel is moved by said suction pressure said nozzle being located in said chamber and adapted to deliver equal amounts of unsuspended liquid fuel to each branch passage.

5. In a multi-cylinder combustion engine the combination with a separate intake passage for each cylinder, a single distributing chamber through which each passage receives air for combustion and means arranged to deliver liquid fuel into all the passages on every inspirating impulse of the said multi-cylinder engine.

6. In a multi-cylinder engine the combination of a separate intake passage for each cylinder, a single distributing chamber through which each intake receives air and means arranged to deliver liquid fuel into all the intakes on every inspirating impulse of the engine, said chamber and separate intakes being organized to conduct unsuspended liquid fuel to the engine cylinders and means for simultaneously controlling the flow through said intakes.

7. In a multi-cylinder engine the combination of several intake pipes radiating from a central chamber having an entrance for air which is common to all said pipes, a rotary barrel-type throttle centrally related to said chamber, manual means to turn said throttle to increase or decrease the openings through said intake pipes and a liquid fuel nozzle centrally related to said throttle and adapted to deliver unsuspended liquid fuel to each intake pipe.

8. In a combustion engine the combination of fuel and air mixing means including a nozzle delivering unsuspended fuel liquid, an intake pipe receiving the unsuspended liquid and sloping downwardly from the nozzle toward the engine cylinders to conduct the fuel and air to the engine cylinder and a dam in the floor of said pipe intercepting the flow therethrough and adapted to hold liquid fuel therein for later delivery to the air flow therethrough.

9. The combination in a multi-cylinder engine, of means providing a chamber and provided with air and liquid fuel inlets thereto, a separate intake for each cylinder leading from said chamber and from close proximity to said liquid fuel inlet so as to receive unsuspended liquid fuel delivered thereby, and throttle means for each intake, said throttle means operating jointly to open and close said intakes proportionally.

10. The combination in a multi-cylinder engine, of means providing a chamber and provided with air and liquid fuel inlets thereto, and a plurality of intakes for the cylinders leading from said chamber, the floor of said chamber sloping downwardly from said liquid fuel inlet to each of the entrances to said intakes.

11. The combination in a multi-cylinder engine, of means providing a chamber and provided with air and liquid fuel inlets thereto, and a separate intake for each cylinder leading from said chamber, the floor of said chamber being provided with an individual trough for each intake sloping downwardly from the fuel inlet to the entrance of the intake.

12. The combination in an internal combustion engine, of a plurality of intake passages therefor, a distributing chamber fixed with respect to said passages, and a carburetor delivering fuel and air to said chamber for distribution thereby, the walls of the distributing chamber being so shaped that unsuspended fuel flows into said passages equally.

13. The combination in an internal combustion engine, of individual intake passages therefor, and a distributing chamber fixed with respect to said passages and having separate carburetor fuel and air inlets opening thereinto, the walls of the distributing chamber being so shaped that unsuspended fuel flows into said passages equally.

14. The combination in an internal combustion engine, of a plurality of intake passages therefor, a distributing chamber fixed with respect to said passages, and a carburetor delivering fuel and air to said chamber for distribution thereby, the floor of the distributing chamber sloping downwardly to the entrance to each intake passage whereby unsuspended liquid fuel is delivered to the intake passages equally.

15. The combination in an internal combustion engine, of individual intake passages therefor, a distributing chamber fixed with respect to said passages, and a carburetor delivering fuel and air to said chamber for distribution thereby, the floor of the distributing chamber sloping downwardly to the entrance to each intake passage, and the carburetor nozzle being disposed to deliver liquid fuel into said chamber symmetrically with respect to said intake entrances.

16. In a multi-cylinder internal combustion engine, the combination of a single fuel spray delivering means and a plurality of separate intake passages arranged to draw fuel therefrom, all the passages being similarly arranged in and with respect to the path of liquid fuel drawn from said means by the separate suctions of said passages whereby some liquid fuel is delivered to all the passages by the inspiration of any one of them and thereby the fuel is distributed to said intakes equally.

17. In a multi-cylinder internal combustion engine, a fuel system comprising a plurality of separate intake passages, a common entrance passage leading to all said separate passages, and a spray means delivering fuel under the reduced pressure of said common entrance, said separate passages opening symmetrically from said common entrance passage, and substantially transverse to the axis thereof, whereby fuel is delivered in liquid form to all said separate passages on every inspiration of one of them.

18. A combustion engine comprising a plural number of engine cylinders disposed in a straight row and having intake valves and exhaust heated vaporizing chambers disposed on the same side of said row, a carburetor having a distributing chamber and separate passages connecting the same with each of said vaporizing chambers, said distributing chamber and passages being devoid of liquid-retaining cavities and adapted to deliver unsuspended liquid equally to each of said chambers.

19. In a multi-cylinder internal combustion engine, a combination of valve means for the intake ports thereof, a plurality of vaporizers, an individual intake passage leading to each vaporizer, a carburetor, and a distributing chamber receiving air and fuel from the carburetor and distributing the same to the intake passages, the distributing chamber being arranged to distribute unsuspended liquid fuel to the intake passages equally.

In testimony whereof, I have signed this specification.

JOHN GOOD.